Jan. 22, 1957  C. STENCHEVER ET AL  2,778,465
MANUALLY ACTUATED NON-YEILDING CLUTCH
Filed May 28, 1954  2 Sheets-Sheet 1

INVENTORS
CHARLES STENCHEVER
& FRANK MASTANDREA
BY
Carl Miller
ATTORNEY

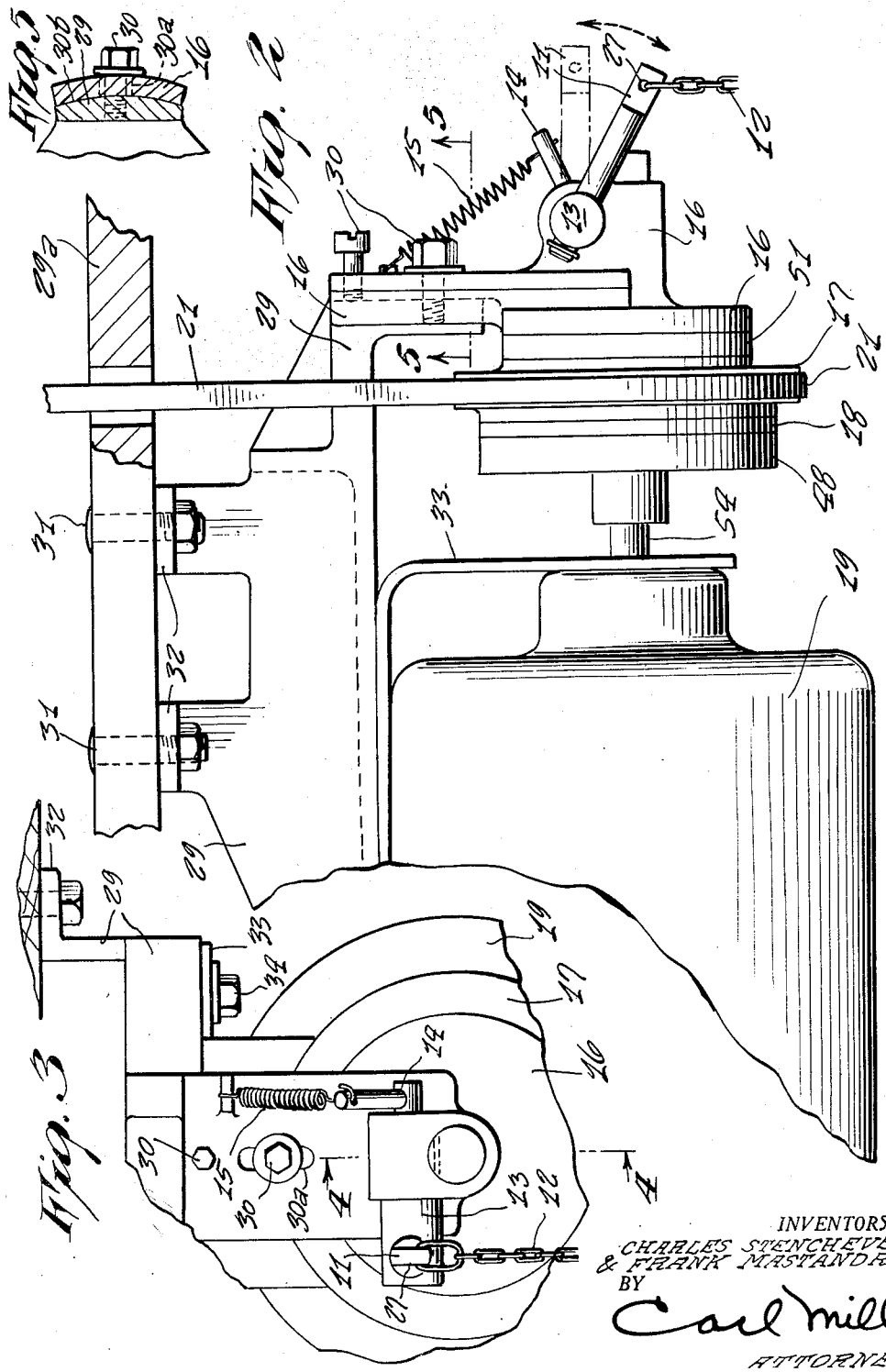

2,778,465
Patented Jan. 22, 1957

2,778,465
MANUALLY ACTUATED NON-YIELDING CLUTCH

Charles Stenchever, Middle Village, and Frank Mastandrea, Maspeth, N. Y.

Application May 28, 1954, Serial No. 433,082

1 Claim. (Cl. 192—18)

This invention relates to clutches which are engaged by manual means and disengaged by some automatic biasing mechanism.

Conventionally, as for example in the common automobile, the clutch device used for causing engagement between the driving shaft and the driven shaft maintains the engaged position by means of a spring pressed mechanism and permits disengagement by manually operated lever and (or) gear trains. Consequently, during the engagement period the resiliency afforded by the spring pressed mechanism allows periodic brief reduction in clutch plate pressures, causing slippage and its attendant objectionable results. For example, partial clutch slippage results in wear and tear on the clutch plate, power losses, and heating due to the generated friction.

The instant device is not subject to these objections, since the engagement is manually maintained by a positive acting non-yielding pinion arrangement.

Consequently, it is the prime object of this invention to provide a clutch arrangement which is manually maintained through a positive non-yielding lever and geared mechanism resulting in the axial movement of a racked shaft towards the engaging position, wherein the cessation of manual effort results in the automatic reverse axial movement towards the disengaged position, which can be especially useful in such environments as sewing machines, lathes, etc.

A secondary inventive object comprises a clutch which is retained in the engaged position through an axially reciprocable shaft driven by a pinion which in turn is actuated by a manually powered lever system, the lever system being biased to the disengaged position by a spring, which urges the clutch plate against a friction brake attached to the shaft housing.

Further objects and inventive details will be disclosed in the ensuing detailed description as applied to the attached drawings in which:

Figure 2 is an enlarged view of the clutch invention.

Figure 3 is an end view thereof.

Figure 5 is a partial sectional view taken along plane 5—5 of Figure 2.

Figure 1:
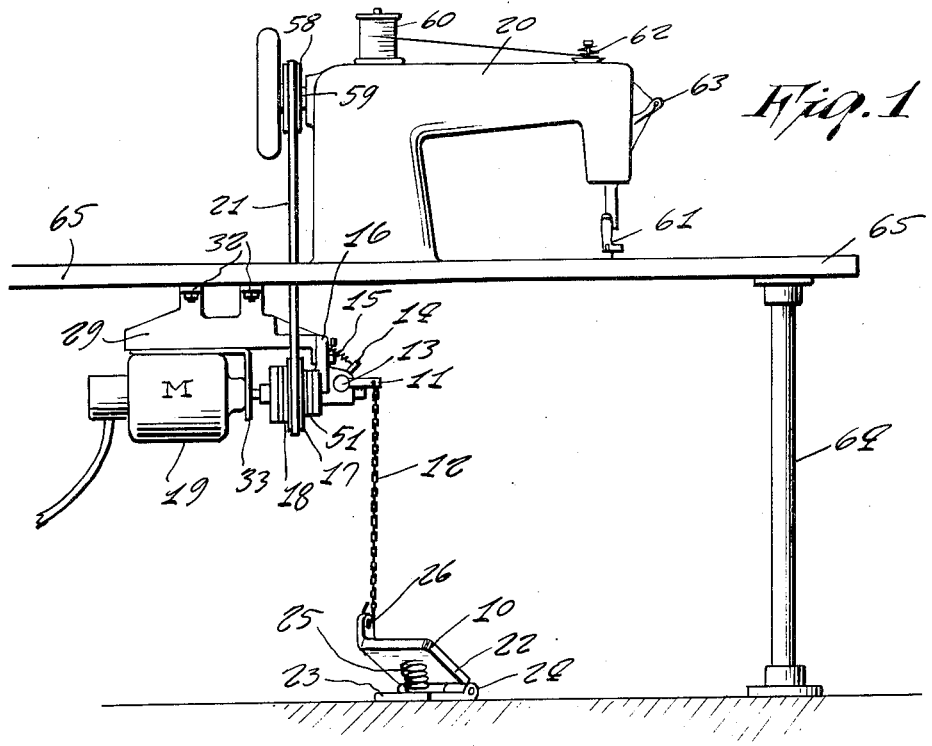
Figure 1 is a rear elevation of the invention as applied to a sewing machine environment.

Referring now to Figure 1, the combination is seen to comprise the spring biased foot pedal 10, connected to the lever 11 by the chain 12. The lever 11 causes rotation of the pinion 13, reverse rotation being effected through lever 14, which is urged to the disengaged position via the spring 15 connected to the housing 16. The pulley 17 is driven by the rotation of the pinion 13 until engagement is made with the friction drive disc 18, which is powered by the motor 19. Power is transmitted to the sewing machine 20 by the belt 21, which is fitted to the periphery of the pulley 17. The foot pedal 10 comprises the pedal plate 22 pivoted to the anchor plate 23 by the hinge 24 and the spring 25, which butts against the plates 22 and 23. Lug 25 is formed on the plate 22 and includes the hole 26 for connection to the chain 12.

Referring to Figure 2, it is seen that the lever 11 is formed with the hole 27 for connection to the chain at one end, and to the pinion gear 13 at the other end. Attached to the pinion 13 at the other side is the lever 14 which is affixed to the spring 15 which in turn is connected to the lug 28 formed on the housing portion 16. Housing portion 16 is attached to the bracket 29 by the screws 30 in an adjustable manner by the provision of the slotted hole 30a. The width of the slot 30a is slightly larger than the bolt diameter, and the portion 16 is curved, mating with the curved exterior of bracket 29, whereby the housing portion 16 can be shifted vertically or laterally, if desired.

The bracket 29 is mounted to the base 29a of the device to be driven by means of the bolt 31 and the perforated flange 32. The motor 19 is suspended from the housing 29 by the hanger 33, which is bolted to the housing 29 with the bolts 34. Thus, it is apparent that either the pulley 17 or the motor 19 can both be disconnected from the mounting bracket 29, for maintenance purposes.

Figure 4:
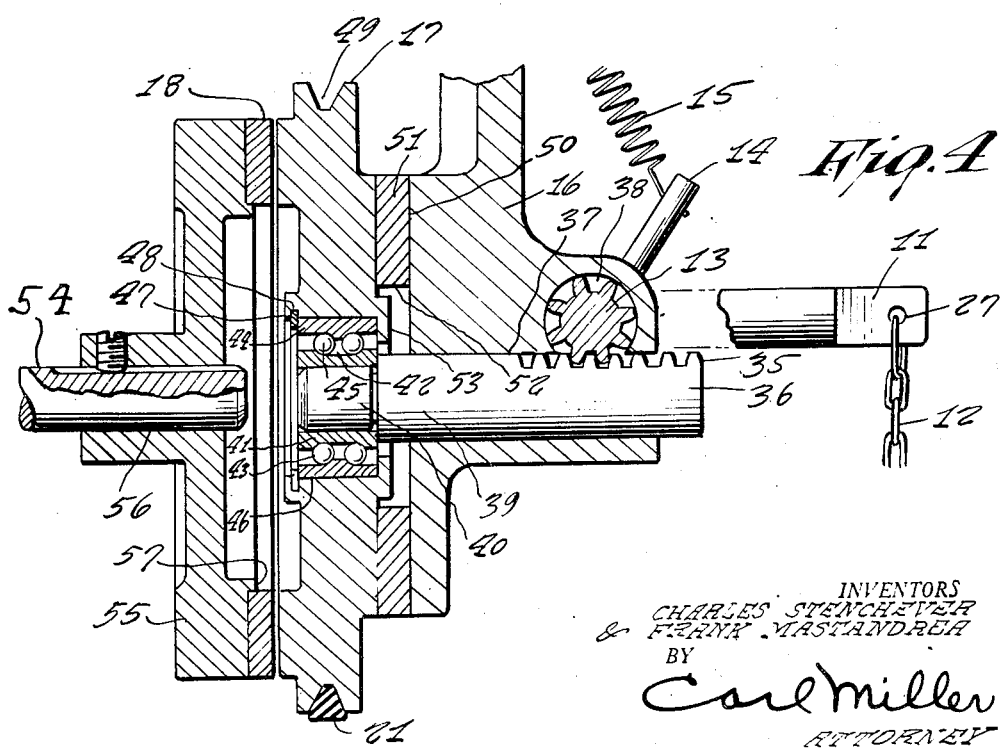
Figure 4 is a cross-sectional view of Figure 3 through plane 4—4.

Referring now to Figure 4, it can be better seen that the pinion 13 meshes with the gear teeth 35 formed on the shaft 36 which is reciprocably journalled in bore 37 of the housing 16. Pinion 13 is rotatably swivelled within bore 38 which intersects the bore 37 to provide an aperture for the coaction between the pinion 13 and the toothed shaft 36. The inner end 39 of the shaft 36 is fitted with the reduced head 40 to which is peripherally rigidly connected the bearing ring 41 formed with the annular depression 42 for retaining the ball bearing 43.

Encompassing snugly the balls 43 is the retaining ring 44 provided with the inner bevelled shoulder 45 which applies the proper retaining pressure against the side walls of the depression 42. Retaining ring 44 is secured within the housing bore 46 by the closure disc 47 resiliently lodged in the annular groove 48 formed in the housing 16.

A groove 49 is provided peripherally of the pulley 17 for the retention of the belt 21. Removably but firmly attached to the housing wall 50 is the brake lining 51, which is perforated at 52 to permit the protrusion of the shaft 39 and the annular collar 53 formed to bear against the outer surface of the retaining ring 44.

Power is transmitted from the motor 19 by the keyed shaft 54, which is removably fixed to the flywheel 55 having the bore 56, the inner transverse annular ridge 57 providing a lip for the rigid retention of friction drive disc 18.

In operation, the operator wishing to power a device such as a sewing machine, first cuts on the motor 19 and then presses down on the pedal plate 22, thus causing a downward movement of the lever 11, resulting in clockwise pinion rotation. Such rotation propels shaft 36 forward to cause similar forward motion of pulley 17 until engagement is had with the disc 18, whereupon rotary motion is imparted to the pulley 17 which is transmitted to the belt 21 and thence to the pulley wheel 58. Thus shaft 59 rotates, causing the actuation of the spool thread 60 and the needle 61, the thread being guided and controlled by the guide 62 and eye 63. A strut 64 supports the sewing machine base 65.

Upon the cessation of pressure on the pedal 22, spring 25 urges pedal 22 to its normal position, thus permitting spring 15 to reciprocate the shaft 36 outwardly. Thus, pulley 17 becomes disengaged from disc 18 and forced against brake lining 51 which immediately stops the rotation.

It is apparent that the instant device is not limited for use only with sewing machines. Any device requiring intermittent operation can be hooked up with the pulley belt 21 and so cause its actuation.

From the foregoing disclosure it is now apparent that when in the engaged position, manually maintained actuation is utilized, thus ensuring power transmission only when desired by the operator. Moreover, since there are no yielding elements such as a spring in the linkage causing engagement, no slipping can occur due to vibrations or other mechanical aberrations. Upon cessation of the manually maintained contact, the pulley 17 transmitting the motor energy to the sewing machine is rapidly brought to rest by the forced engagement with the brake lining, whereby no movement of the sewing machine occurs after release of the pedal 22.

Due to the mounting arrangement disclosed, either motor or clutch assembly can be torn down individually for servicing, both units being mounted on a bracket whose configuration lends itself to a simple and practical installation.

Be it further understood that the many variations obtainable by modifications in size, shape and material, are all contemplated within the inventive scope.

Having thus described and illustrated the nature of the invention, what is claimed is as follows:

A manually maintained engagement type positive clutch comprising a motor driven flywheel provided with friction drive means annularly disposed about the flywheel periphery, in combination with a pulley having friction engaging surfaces spaced from and parallel to the first said means, said pulley being rotatably mounted about a shaft which is biased axially away from said flywheel, said shaft being journalled within a housing and provided with manually operated non-yielding means for causing axial shaft movement towards the flywheel, said latter means being spring biased, whereby said shaft is normally urged to a position of clutch disengagement, in further combination with a pulley belt attached to the periphery of said pulley at one end and the periphery of a second pulley at the other end, said second pulley driving a second shaft, said manually operated non-yielding means comprising a lever operated by a foot pedal, said lever being connected to a pinion gear journalled in the housing, and said shaft being provided with gear teeth for coaction with the pinion gear, said lever being mounted on a bracket adjustably connected to the housing whereby the bracket can be moved vertically and laterally, and said lever being connected to a chain, the latter being connected to a hinged plate located near the operator's foot, and said hinged plate being spring pressed toward said lever, said pinion gear being also connected at the side remote from said lever to a second lever, the latter being spring biased in a direction which causes the flywheel and the pulley to be disengaged, and said first shaft having an end remote from the pinion gear, a head, said head having a ring affixed peripherally thereto, including a second ring spaced from and surrounding the first said ring and affixed to the pulley, and ball bearings retained between said two rings, one of said rings having sloping surfaces about the peripheral surface, and the other of said rings having sloping surfaces about its interior surface, said surfaces being oppositely disposed, whereby retaining pressure is applied to the ball bearings, and said pulley being formed with a central bore encompassing the two rings, a transverse shoulder protruding inwardly from said bore providing an outer bearing surface for said other ring and a closure disc lodging in an annular groove in the pulley providing an inner bearing for said other ring, whereby said rings and the ball bearings are retained within the pulley central bore, and said pulley having a transverse surface on the side remote from the flywheel, and said casing being provided with a surface spaced from and parallel to the surface of said pulley, including a brake lining disc affixed to the latter, whereby pressure contact is had between the latter and the brake lining when the clutch is disengaged.

References Cited in the file of this patent
UNITED STATES PATENTS

| | | |
|---|---|---|
| 1,444,573 | Voigt | Feb. 6, 1923 |
| 2,518,725 | Sauer et al. | Aug. 15, 1950 |
| 2,621,620 | Chatfield | Dec. 16, 1952 |